May 21, 1940.   J. PICCO   2,201,788
NONSINKABLE CRAFT
Filed Jan. 26, 1939   3 Sheets-Sheet 1
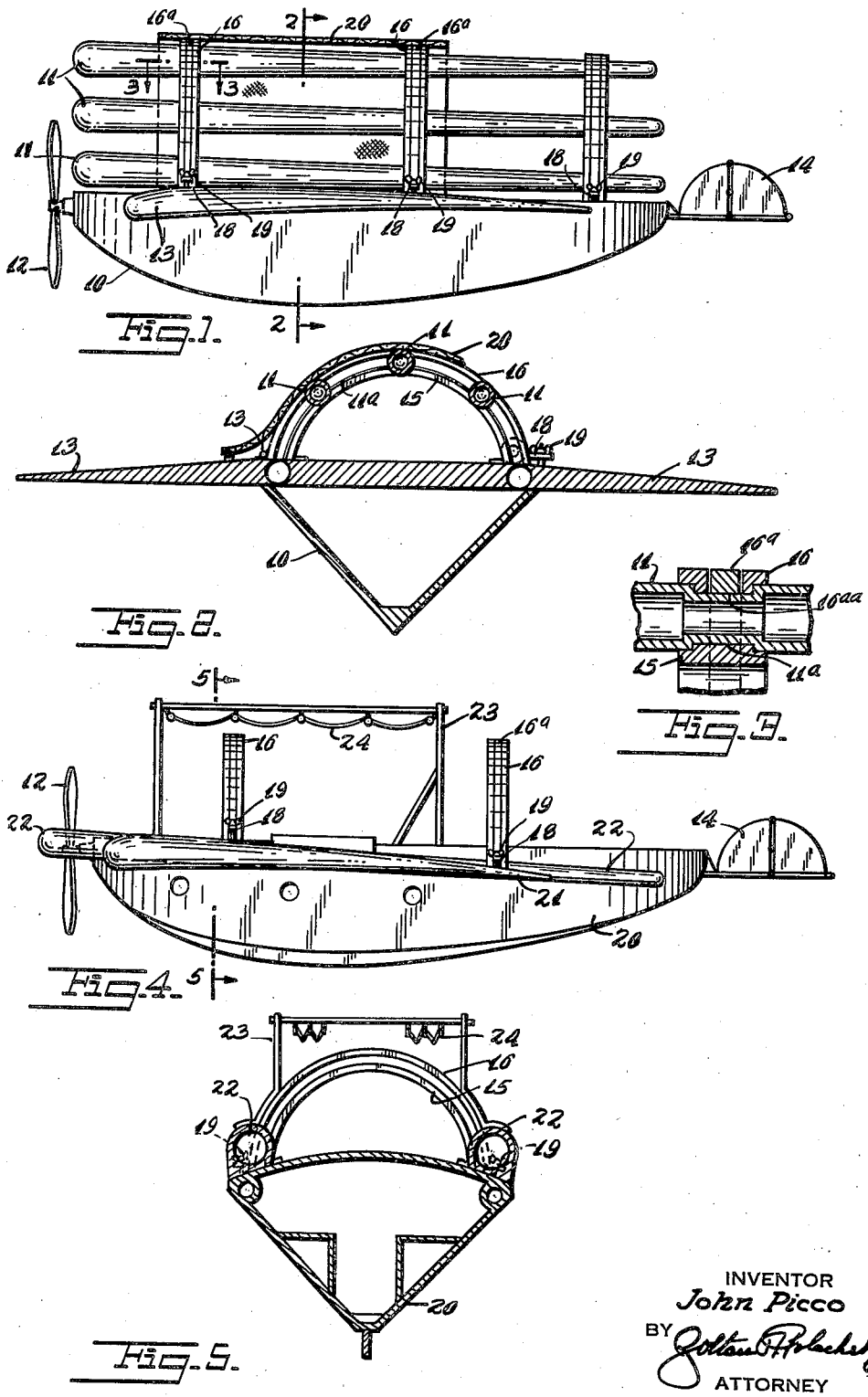
INVENTOR
John Picco INVENTOR
John Picco May 21, 1940.                J. PICCO                2,201,788
                          NONSINKABLE CRAFT
                      Filed Jan. 26, 1939           3 Sheets-Sheet 3

INVENTOR
John Picco
BY
Zoltan H Polachek
ATTORNEY

Patented May 21, 1940

2,201,788

UNITED STATES PATENT OFFICE 2,201,788

NONSINKABLE CRAFT

John Picco, New York, N. Y.

Application January 26, 1939, Serial No. 252,879

9 Claims. (Cl. 114—68)

This invention relates to new and useful improvements in a nonsinkable craft.

The invention has for an object the construction of a nonsinkable water craft which embodies a feature adapted to be used on a boat or seaplane or supporting floating apparatus or other similar craft making it nonsinkable.

The invention has for an object the association with a craft body of a plurality of floaters mounted thereon to make the body nonsinkable.

Still further the invention contemplates arranging the floaters in a manner so that they may be moved to various positions upon the body to facilitate floating portions thereof.

Another object of the invention resides in providing a construction above the water level of a craft body, adapted to assist in eliminating the natural rolling movement of the waves during high seas and acting to hold the craft body on an even keel.

Still further the invention contemplates constructing the floaters of tubular material or solid material, and if constructed of tubular material to provide compartments therein for holding fluids such as gasoline, oil, etc.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a seaplane provided with a construction according to this invention to make it nonsinkable.

Fig. 2 is a transverse vertical sectional view taken on the line 2—2 of Fig. 1.

Fig. 3 is a fragmentary enlarged horizontal sectional view taken on the line 3—3 of Fig. 1.

Fig. 4 is a side elevational view of a seaplane constructed according to a modified form of the invention.

Fig. 5 is a transverse vertical sectional view taken on the line 5—5 of Fig. 4.

Figure 6:
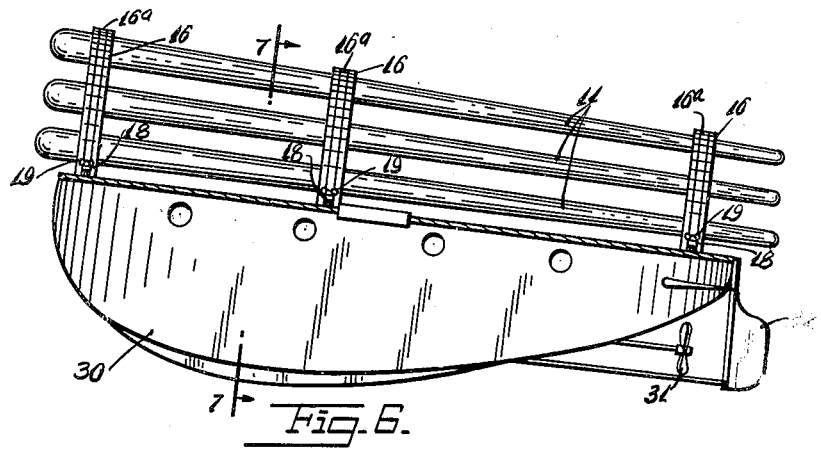
Fig. 6 is a side elevational view of a boat embodying this invention.

The nonsinkable craft, according to this invention, includes a hollow craft body 10 adapted to float, and a plurality of floaters 11 mounted on said body for making the same nonsinkable. In the form of the invention shown in Figs. 1 to 3 the craft body comprises a seaplane. This plane has a motor driven propeller 12, wings 13, a rudder 14 and other structure generally present in a seaplane. The inventive feature includes several groups of tracks arranged in a specific manner for supporting the floaters 11. Each group comprises a pair of spaced inside and outside tracks 15 and 16, respectively, of arched form extending across the sides of the craft body.

Each floater 11 has a circumferential reduced portion 11$^a$ at areas where the floaters pass between the tracks 15 and 16 and the tracks have projecting tongues engaging into these areas. Each of the top tracks 16 is provided with a section 16$^a$ which is hingedly mounted by a hinge 17 at one of its ends, and its other end is provided with a projecting lip 18 engaged by a bolt 19 or similar fastening element by which it may be clamped downwards or released. When the lip 18 is pressed downwards by the bolt 19 the section 16$^a$ tightly engages against the reduced portions 11$^a$ of the floaters 11 to hold them in adjusted positions. For this purpose the inner face of the track section 16$^a$ is formed with teeth or serrations 16$^{aa}$. A canvas cover 20 or other similar cover is engaged over the tracks for providing a cover for the craft body to act as support wing.

The floaters 11 may be of any material capable of floating. Certain specific examples will hereinafter be given. The floaters 11 are arranged longitudinally of the craft body and are arranged spaced from each other. Should the craft body be involved in an accident and turn dangerously towards one side or the other and threaten to roll over, then the bolts 19 are loosened so that the track sections 16$^a$ are loose and the floaters 11 are moved over to the particular side requiring buoyancy. Or, under certain conditions the floaters may be moved over to the other side to help counter-balance the tipping tendency of the latter-mentioned side. The bolts 19 may be re-engaged to clamp the floaters 11 in their new positions. The floaters are arranged to have a sufficient floating capacity to float the craft body even though it fills up partially or completely with water.

In Figs. 4 and 5 another embodiment of the invention has been disclosed which distinguishes from the prior form in several respects. A craft body has been illustrated having wings 21 through which several large floaters 22 are mounted. The craft body is also provided at spaced positions with the tracks 15 and 16 adapted to hold additional floaters 11, not illustrated on the drawing in these particular figures. This craft is also provided with a framework 23 having overhead lines 24 to which passengers may hold on when necessary, particularly when the craft body fills up with water and the nonsinkable craft is being held afloat by the floaters. In other respects this form of the invention is similar to the previous form.

Figure 7:
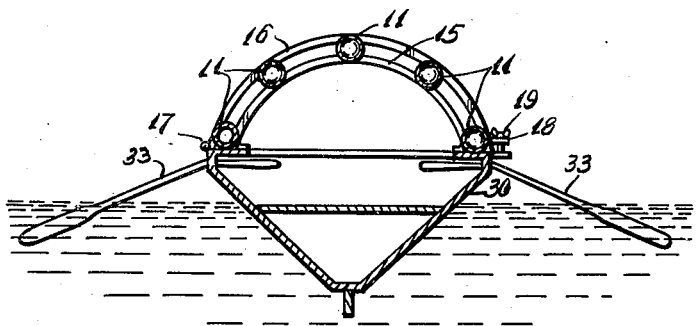
Fig. 7 is a transverse vertical sectional view taken on the line 7—7 of Fig. 6.

In Figs. 6 and 7 another modified form has been illustrated in which a nonsinkable craft 30 is shown. This craft has a water propeller 31 and a rudder 32. Upon the upper portion of the craft there are several groups of spaced tracks 15 and 16 supporting a plurality of spaced floaters 11. These tracks are constructed as previously described and component parts thereof will be recognized by the identical reference numbers. The water craft body is also provided with oars 33 by which it may be propelled.

Figure 8:
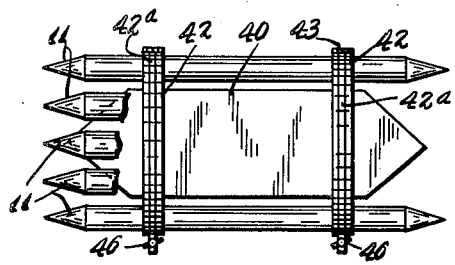
Fig. 8 is a plan view of a boat constructed according to a further modified form of the invention.
Figure 9:
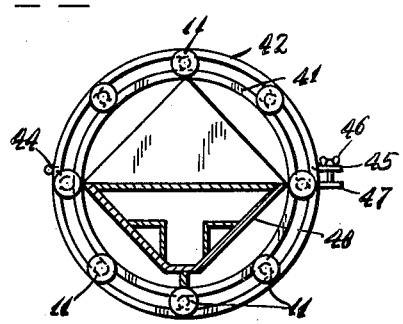
Fig. 9 is a vertical sectional view of the boat shown in Fig. 8.

In Figs. 8 and 9 a still further modified form of the invention is disclosed in which there is a craft body 40 completely encircled, at spaced positions, with concentric groups of annular tracks. There is an inner track 41 in each group slightly spaced from an outer track 42. Between these tracks there are the floaters 11. The upper halves of the outer tracks 42 are provided with central sections 42$^a$ which are hingedly supported by hinges 43 at one of their ends and at other ends being provided with projecting portions 45 engaged by bolts 46 cooperative with stationary lugs 47 by which the hinge sections 42 may be clamped and released.

The floaters 11 in the bottom half of the annular tracks may be fixed in desired spaced positions. The floaters 11 in the top halves of the circular tracks may be shifted towards one side or the other by loosening the bolts 46 to release the gripping action of the track sections 42$^a$. After suitable adjustment of the location of the floaters 11 has been made the bolts 46 are re-engaged to hold the floaters in fixed positions.

Figure 10:
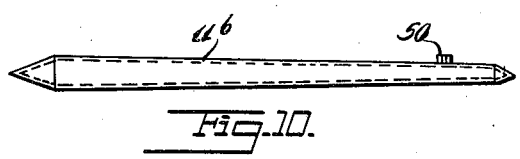
Fig. 10 is a side elevational view of one of the floaters according to this invention.

In Fig. 10 a floater 11 is illustrated which is constructed in the form of a hollow shell having a valve 50 at one end through which oil, gasoline or the like may be placed therein for storage and removed when desired.

Figures 11, 12:
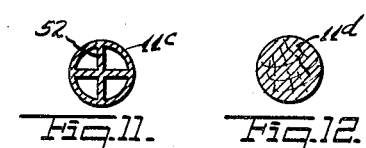
Fig. 11 is a transverse sectional view of the floater shown in Fig. 10.
Figs. 12, 13 and 14 are transverse sectional views of different floaters adapted to be used in this invention.

In Fig. 11 a hollow floater 11$^c$ is illustarted provided with a plurality of partitions 52 dividing off separate compartments. Should one compartment be accidentally broken the other compartments will still be good and act to buoy the float.

Figures 13, 14:
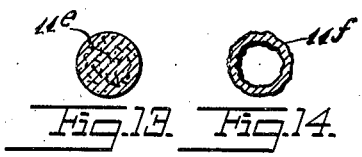

In Fig. 12 a solid wood or hollow wood float 11$^d$ has been illustrated. In Fig. 13 a solid cork float 11$^e$ is shown. In Fig. 14 a float 11 is illustrated formed from wavy sheet metal. Sponge rubber may be used to build the floaters.

Figure 15:
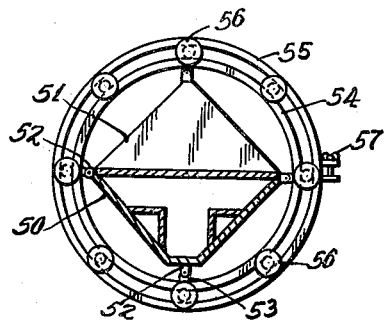
Fig. 15 is a transverse vertical sectional view of another boat constructed according to a further modified form of the invention.

In Fig. 15 another modified form of the boat has been illustrated which is characterized by a craft body 50 adapted to float in water and upon the top side of which, at spaced positions, there are transverse vertical walls 51. Upon these walls and upon the sides and bottom of the craft body there are a plurality of roller supports 52 which support rollers 53. These rollers engage the inside track 54 of a pair of concentric tracks 54 and 55 which support a plurality of floaters 56. These concentric tracks 54 and 55 encircle the craft body 50.

The floaters 56 are disposed between and supported upon the concentric angular tracks 54 and 55. The rollers 53 have flanges engaging the sides of the tracks to prevent displacement. The arrangement is therefore such that the concentric members 54 and 55 are free to rotate about the craft body 50. This is advantageous in the event that one or more of the floaters 56 become damaged. In such event merely a rotation of the tracks will occur about the float body. The track 55 has a central separate section 55$^a$ in the form of a band the ends of which are adjustably connected by a clamp screw 57 by which the floats 56 may be clamped in relatively fixed positions upon the tracks 54 and 55. In other respects the construction is similar to that shown in Fig. 3.

Figure 16:
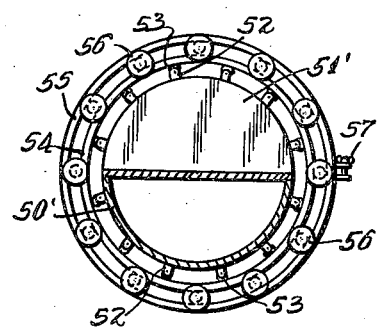
Fig. 16 is another transverse vertical sectional view of a boat embodying another modification of the invention.
Figure 17:
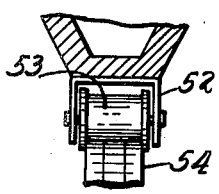
Fig. 17 is a fragmentary sectional view taken on the line 17—17 of Fig. 18.
Figure 18:
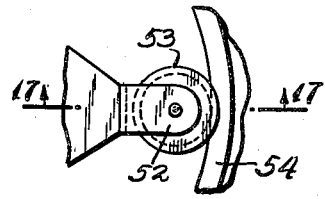
Fig. 18 is an enlarged detailed view of a portion of Fig. 16.
Figure 19:
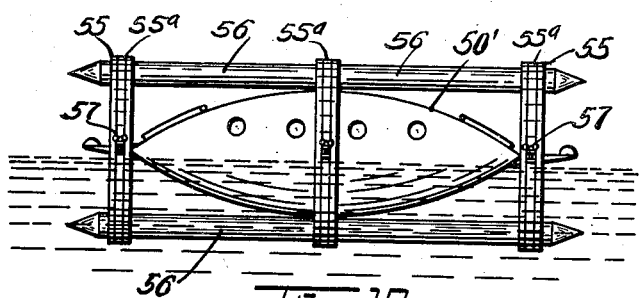
Fig. 19 is a side elevational view of the boat shown in Fig. 16.

In Figs. 16 and 19 another craft body 50' is illustrated which is merely of a different shape than the craft body 50. This craft body 50', at spaced positions has semi-circular walls 51'. It is upon these walls that roller supports 52 are mounted which in turn support the rollers 53. In other respects this form of the invention is similar to the previous form.

In Fig. 19 a side elevational view of the craft illustrated in Fig. 16 is shown. It should be noted that there are three units similar to the one shown in Fig. 16. These units are arranged at the two ends and at the center of the craft. It is these units which support the floaters 56 which extend from end to end of the craft. The floaters 56 are recessed at the areas engaged by the tracks, similar to the showing of Fig. 3.

Figure 20:
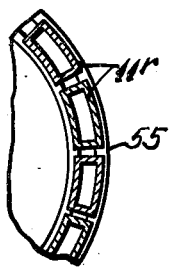
Fig. 20 is a fragmentary detail view of another form of the device.

In Fig. 20, float members of rectangular cross-sections 11$^r$ are illustrated.

Figure 21:
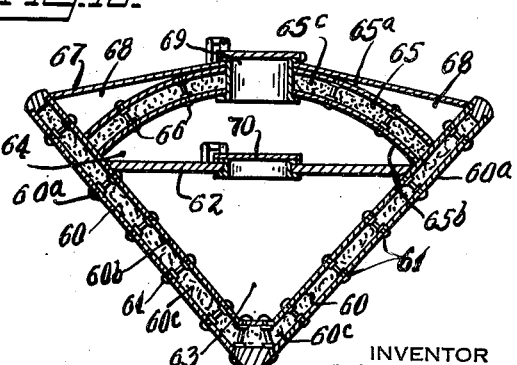
Fig. 21 is a transverse vertical sectional view of another boat constructed according to a still further modified form of this invention.

In Fig. 21 another modified form of the invention has been disclosed which distinguishes in many respects from the prior forms. In this form there is a craft body 60 having walls composed of an outside plate 60$^a$, an inside plate 60$^b$ and filling material 60$^c$ between these plates. Fastening elements 61 serve to hold the plates and filling material together as a unit. This filling material 60$^c$ may be sponge rubber, cork or other similar material. The craft body 60 has a horizontal partition 62 dividing off a bottom compartment 63 and a top compartment 64. The top compartment is covered by an arcuate wall 65 also constructed of side plates and filling material. There is an outside plate 65$^a$, an inside plate 65$^b$ and filling material 65$^c$ in the nature of sponge rubber, cork or the like.

Bolts 66 hold the plates and filling material together as a unit. Additional plates 67 are extended tangentially from the top of the arcuate wall 65 to the side walls of the craft producing air spaces 68 which act as floats. A hatch 69 is provided through which persons from the outside may enter the compartment 64. A second hatch 70 is arranged in the wall 62 through which the compartment 63 is accessible.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A nonsinkable craft, comprising a hollow body adapted to float, a plurality of buoyant elements for said body to assist in buoying said body in the event it should become partially or completely filled with water, and means for adjustably supporting said buoyant elements transversely of said body so that they may be shifted to the side of said body requiring the greatest amount of buoyance comprising groups of tracks mounted transversely of said body at spaced positions along the length thereof, each group of tracks consisting of an inside track element, an outside track element spaced slightly from said inside track element, said buoyant elements having a diameter greater than the distance between said track elements and formed to provide grooves therein of sufficient depth to fit between the track elements and of a width to engage the opposite sides of said track elements to prevent longitudinal movement of said buoyant elements relative to said track elements.

2. A nonsinkable craft, comprising a hollow body adapted to float, a plurality of buoyant elements for said body to assist in buoying said body in the event it should become partially or completely filled with water, and means for adjustably supporting said buoyant elements transversely of said body so that they may be shifted to the side of said body requiring the greatest amount of buoyance comprising groups of tracks mounted transversely of said body at spaced positions along the length thereof, each group of tracks consisting of an inside track element, an outside track element spaced slightly from said inside track element, said buoyant elements having a diameter greater than the distance between said track elements and formed to provide grooves therein of sufficient depth to fit between the track elements and of a width to engage the opposite sides of said track elements to prevent longitudinal movement of said buoyant elements relative to said track elements, and means for clamping said buoyant elements in various transverse adjusted positions between said track elements.

3. A nonsinkable craft, comprising a hollow body adapted to float, a plurality of buoyant elements for said body to assist in buoying said body in the event it should become partially or completely filled with water, and means for adjustably supporting said buoyant elements transversely of said body so that they may be shifted to the side of said body requiring the greatest amount of buoyance comprising groups of tracks mounted transversely of said body at spaced positions along the length thereof, each group of tracks consisting of an inside track element, an outside track element spaced slightly from said inside track element, said buoyant elements having a diameter greater than the distance between said track elements and formed to provide grooves therein of sufficient depth to fit between the track elements and of a width to engage the opposite sides of said track elements to prevent longitudinal movement of said buoy elements relative to said track elements, and means for clamping said buoyant elements in various transverse adjusted positions between said track elements, comprising a section cut from one of said track elements, means for pivotally mounting one end of said section, a projecting lip formed on the other end of said section, and a clamp screw mounted on said body and engageable with said lip for urging said section against said buoyant elements and clamping them in position between said section and the other of said track elements.

4. A nonsinkable craft, comprising a hollow body adapted to float, a plurality of buoyant elements for said body to assist in buoying said body in the event it should become partially or completely filled with water, and means for adjustably supporting said buoyant elements transversely of said body so that they may be shifted to the side of said body requiring the greatest amount of buoyance comprising groups of tracks mounted transversely of said body at spaced positions along the length thereof, each group of tracks consisting of an inside track element, an outside track element spaced slightly from said inside track element, said buoyant elements having a diameter greater than the distance between said track elements and formed to provide grooves therein of sufficient depth to fit between the track elements and of a width to engage the opposite sides of said track elements to prevent longitudinal movement of said buoyant elements relative to said track elements, and means for clamping said buoyant elements in various transverse adjusted positions between said track elements, comprising a section cut from one of said track elements, means for pivotaly mounting one end of said section, a projecting lip formed on the other end of said section, and a clamp screw mounted on said body and engageable with said lip for urging said section against said buoyant elements and clamping them in position between said section and the other of said track elements, and serrations formed on the face of said section which engages said buoyant elements to assist in clamping said buoyant elements in position.

5. A nonsinkable craft, comprising a hollow body adapted to float, a plurality of buoyant elements for said body to assist in buoying said body in the event it should become partially or completely filled with water, and means for adjustably supporting said buoyant elements transversely of said body so that they may be shifted to the side of said body requiring the greatest amount of buoyance comprising groups of tracks mounted transversely of said body at spaced positions along the length thereof, each group of tracks consisting of an inside track element, an outside track element spaced slightly from said inside track element, said buoyant elements having a diameter greater than the distance between said track elements and formed to provide grooves therein of sufficient depth to fit between the track elements and of a width to engage the opposite sides of said track elements to prevent longitudinal movement of said buoyant elements relative to said track elements, said track elements being semi-circular and mounted on top of said body.

6. A nonsinkable craft, comprising a hollow body adapted to float, a plurality of buoyant elements for said body to assist in buoying said body in the event it should become partially or completely filled with water, and means for adjustably supporting said buoyant elements transversely of said body so that they may be shifted to the side of said body requiring the greatest amount of buoyance comprising groups of tracks mounted transversely of said body at spaced positions along the length thereof, each group of tracks consisting of an inside track element, an outside track element spaced slightly from said inside track element, said buoyant elements having a diameter greater than the distance between said track elements and formed to provide grooves therein of sufficient depth to fit between the track elements and of a width to engage the opposite sides of said track elements to prevent longitudinal movement of said buoyant elements relative to said track elements, said track elements being circular and extended completely around said body.

7. A nonsinkable craft, comprising a craft body, a series of parallel spaced tracks encircling said craft body, a plurality of elongated buoyant elements extended at right angles to said tracks and arranged at spaced positions around the outside face of said tracks, a second series of parallel spaced tracks engaging around said buoyant elements for maintaining them in position for providing a means for keeping said craft body afloat in the event it should become partially or completely filled with water, and rollers mounted on said craft body and engaging the inside face of said first series of tracks permitting said craft body to move relative to said tracks to maintain an even keel regardless of the movement of said tracks.

8. A nonsinkable craft, comprising a craft body, a series of parallel spaced tracks encircling said craft body, a plurality of elongated buoyant elements extended at right angles to said tracks and arranged at spaced positions around the outside face of said tracks, a second series of parallel spaced tracks engaging around said buoyant elements for maintaining them in position for providing a means for keeping said craft body afloat in the event it should become partially or completely filled with water, and rollers mounted on said craft body and engaging the inside face of said first series of tracks permitting said craft body to move relative to said tracks to maintain an even keel regardless of the movement of said tracks, and flanges formed on said rollers and engaging the sides of said first-mentioned series of tracks for fixedly holding said tracks in position on said craft body.

9. A nonsinkable craft, comprising a hollow craft body adapted to float on water, a plurality of pairs of concentric tracks arranged at spaced positions along the length of said craft body and encircling said craft body, a plurality of elongated buoyant elements extending parallel to said craft body and clamped in position between the adjacent faces of said pairs of tracks, and rollers mounted on said craft body and engaging certain of said tracks permitting independent movement of said craft body and buoyant elements.

JOHN PICCO.